(12) United States Patent
Robins

(10) Patent No.: US 7,266,502 B2
(45) Date of Patent: Sep. 4, 2007

(54) FEATURE CENTRIC RELEASE MANAGER METHOD AND SYSTEM

(75) Inventor: Mark Robins, Burlingame, CA (US)

(73) Assignee: Siebel Systems, Inc., San Mateo, CA (US)

(*) Notice: Subject to any disclaimer, the term of this patent is extended or adjusted under 35 U.S.C. 154(b) by 304 days.

(21) Appl. No.: 09/540,391

(22) Filed: Mar. 31, 2000

(65) Prior Publication Data

US 2002/0165742 A1    Nov. 7, 2002

(51) Int. Cl.
*G06Q 99/00* (2006.01)
*H04K 1/00* (2006.01)

(52) U.S. Cl. ............... 705/1; 705/7; 705/8; 705/9; 705/50; 281/16

(58) Field of Classification Search .......... 705/1–10, 705/50; 281/16, 31; 700/1, 92, 100–110; 702/187, 188
See application file for complete search history.

(56) References Cited

U.S. PATENT DOCUMENTS

| | | | |
|---|---|---|---|
| 5,036,472 A * | 7/1991 | Buckley et al. ............ | 700/233 |
| 5,311,438 A | 5/1994 | Sellers et al. | |
| 5,586,039 A | 12/1996 | Hirsch et al. | |
| 5,596,502 A | 1/1997 | Koski et al. | |
| 6,009,406 A | 12/1999 | Nick | |
| 6,161,113 A * | 12/2000 | Mora et al. .............. | 707/505 |
| 6,347,258 B1 * | 2/2002 | Hsu et al. ................ | 700/121 |

FOREIGN PATENT DOCUMENTS

| | | | |
|---|---|---|---|
| DE | 0 314 596 B1 * | 4/1997 | |
| EP | 0 314 596 B1 | 5/1989 | |
| GB | 1375917 | * 12/1971 | |

OTHER PUBLICATIONS

Kronenke, David A., Database Processing: Fundementals, Design, & Implementation ; 2000, 1998, 1995, 1992, 1988. Prentice-Hall, Inc. Seventh Edition, pp. 17, 36-38, 116, 533-534.*
"User's Guide for Microsoft Project." 1995; Microsoft Corporation. pp 3-7, 88, 90, 91, 93, 95, 117, 141, 144. Document Numbe PJ62476-0895.*
Pyron et al. "Using Microsoft Project 4 for Windows." 1994 Que corp. Chapter 4, pp. 95-130.*
Eisener, Howard. "Essentials of Project and Systems Engineering Management." 1997 John Wiley and Sons, Inc; NY. Cpater section 3. pp. 153-176.*
Florida Technology Development Corporation—Integrated Product and Process Design Print Quality Analyzer. MicroView Systems. Apr. 22, 1999.*

* cited by examiner

*Primary Examiner*—Kambiz Abdi
(74) *Attorney, Agent, or Firm*—Campbell Stephenson LLP

(57) ABSTRACT

A feature centric method of and system for monitoring the development and release process of a product, monitoring the development and release of a product, where the product is characterized by having a plurality of features is described. The method steps, which the system is configured to carry out, include enumerating features to be included in the product, enumerating tasks, task milestones, and task milestone completions identified to the features; enumerating required task approvals and feature approvals and completed task approvals and feature approvals, and enumerating required associated activities and completed associated activities. The enumeration preferably includes information to show linkages, associations, priorities, milestones, and missed milestones.

9 Claims, 11 Drawing Sheets

PROJECT

| PROJECT ID # | OWNER ID | PRODUCT NAME | PRODUCT DESCRIPTION | PROJECT DESCRIPTION |
|---|---|---|---|---|

FEATURE

| PROJECT ID # | FEATURE ID # | TITLE | TEAM LEADER | PARENT FEATURE | MARKETING GROUP | PRODUCT AREA |
|---|---|---|---|---|---|---|
| FEATURE SOURCE | ACCOUNT | REVENUE ESTIMATE | PRIORITY | STATUS | LINKS TO OTHER FEATURE | LINKS TO OTHER FEATURES |

ENGINEERING

| PROJECT ID # | FEATURE ID # | ENGINEERING REL # | TITLE | DESCRIPTION | PROJECT TEAM |
|---|---|---|---|---|---|
| ENGINEERING GROUP | PARENT | PRIORITY | LEVEL OF EFFORT | RISK | LINK TO RELATED FEATURES |
| STATUS | DESIGN REVIEW | CODE REVIEW | COMPLETION % | TARGET COMPLETION DATE | |

QUALITY ASSURANCE

| PROJECT ID # | FEATURE ID # | QA RELEASE # | TITLE | DESCRIPTION | PROJECT TEAM | QUALITY ASSURANCE GROUP |
|---|---|---|---|---|---|---|
| RELATED FEATURES | STATUS | COMPLETION % | TARGET COMPLETION DATE | PASSES | LAST BUILD | |

*FIG. 11A*

QUALITY ASSURANCE (INDIVIDUAL TEST)

| PROJECT ID # | FEATURE ID # | QA RELEASE # | TEST # | DATE | TESTER | TEST PLAN | CLIENT OS |
|---|---|---|---|---|---|---|---|
| SERVER OS | WEB SERVER | DATABASE | CLIENT TYPE | TEST TYPE | STATUS | COVER % | PASS % |

TECHNICAL PUBLICATIONS

| PROJECT ID # | FEATURE ID # | PUB REL # | TITLE | DESCRIPTION | DOCUMENT VERSION # | ESTIMATED PAGES |
|---|---|---|---|---|---|---|
| NEW % | PROJECT TEAM | RELATED FEATURES | STATUS | COMPLETION % | TARGET DATE | |

ENTERPRISE SPECIFIC

| PROJECT ID # | FEATURE ID # | MATTER ID # | NON-INFRINGEMENT | NEW APPLICATION | LETTER TO CLIENT |
|---|---|---|---|---|---|

*FIG. 11B*

| FIG. 11A |
|---|
| FIG. 11B |

KEY TO *FIG. 11*

FEATURE CENTRIC RELEASE MANAGER METHOD AND SYSTEM

FIELD OF THE INVENTION

The invention relates to a method of and system for managing a business process, that is, the product release cycle of an enterprise, including monitoring the operation of the project or product team, evaluating the allocation of resources, scheduling tasks, and assigning tasks to individuals and groups to accomplish the project.

BACKGROUND

In order to accomplish a project, such as a new product introduction, it is necessary to effectively plan, schedule, and monitor progress on many sub-elements. This is the Release Management process. As shown in FIG. 1, Release Management typically consists of four main stages:

Stage 1: Product marketing defines product features and develops requirements for the product features. The requirements may take the form of requirements documents.

Stage 2: Engineering enumerates tasks to implement the features, sets milestones for the tasks, and completes the tasks to implement the features.

Stage 3: Quality assurance (QA) verifies the engineering designs and the engineering implementations, and tests the features in the product as it is developed.

Stage 4: Other ancillary steps must be completed, for example, the technical publications group documents the features for the end user, the training group may have to develop training programs, there may be business clearances, such as business practices, training, legal, insurance, environmental, marketing, and executive approvals.

Understandably, the product release process involves a lot of information flowing within and between organizations to ensure a quality product is built on time to the right requirements and with proper documentation. Prior project management methods and paradigms having typically emphasized the linearity and linear dependence aspects of Release Management. FIG. 1 illustrates the apparent linearity of Release Management. Without an integrated system providing overall visibility to help track and communicate task level and sub-task level information, organizations must get by with disconnected systems such as makeshift spreadsheets, white boards, memos, and slips of paper. Often, information is lost or miscommunicated, resulting in a misallocation of resources; missing, undocumented, or inadequately tested features; late product shipments; and, ultimately, dissatisfied customers. And the problem only becomes worse as companies grow and product releases become more frequent and more feature-rich.

Organizations sometimes hire a Release Manager to coordinate the information flow, track release status, and guide important release-related decision making.

SUMMARY

The invention is a method and system for monitoring the development and release of a product, where the product is characterized by having a plurality of features. Typically, each of the features requires a plurality of tasks, as engineering tasks, quality assurance tasks, and technical documentation tasks for approval and completion. The method steps, which the system is configured to carry out, include enumerating features to be included in the product, enumerating tasks, task milestones, task milestone completions, task approvals and feature approvals, and linking them to the features. The tasks are typically grouped by owning function, as engineering, quality assurance, and technical documentation, among others. The enumeration preferably includes information to show linkages, associations, priorities, milestones, and missed milestones. "Link", "linkage", and "linking" are used herein in the sense of a directed logical or virtual connection, exemplified by links in a linked list database, by integrity constraints and keys in a relational database, and by references in a spreadsheet.

The enumeration of the features, tasks, task milestones, task milestone completions, approvals, and completed approvals, optionally with associated activities, and completed associated activities, is stored in a repository, as a database, for example, a relational database with keys and integrity constraints as the links, or a linked list database, or a spreadsheet. In this way, a first set of entries may correspond to all tasks, task milestones, approvals, and associated activities, and a second set of entries may correspond to task milestone completions, completed approvals, and completed associated activities. When the database is a relational database, each of the features has a primary key, and every task, feature, feature milestone, and approval corresponds to a primary key of a feature and has a unique key of its own.

THE FIGURES

The Figures illustrate aspects of the method and system of the invention.

FIG. 5 illustrates a screen view of the "Feature List" view of product release software.

FIG. 6 illustrates a screen view of the "Marketing Requirements Document" view of product release software.

FIG. 7 illustrates a screen view of the "Engineering Task" view of product release software.

FIG. 9 illustrates a screen view of the "Quality Assurance" view of product release software.

FIG. 10 illustrates a screen view of the "Tech Documents" view of product release software.

FIG. 11 illustrates a relational database schema useful in the practice of the invention.

OVERVIEW

Figure 1:
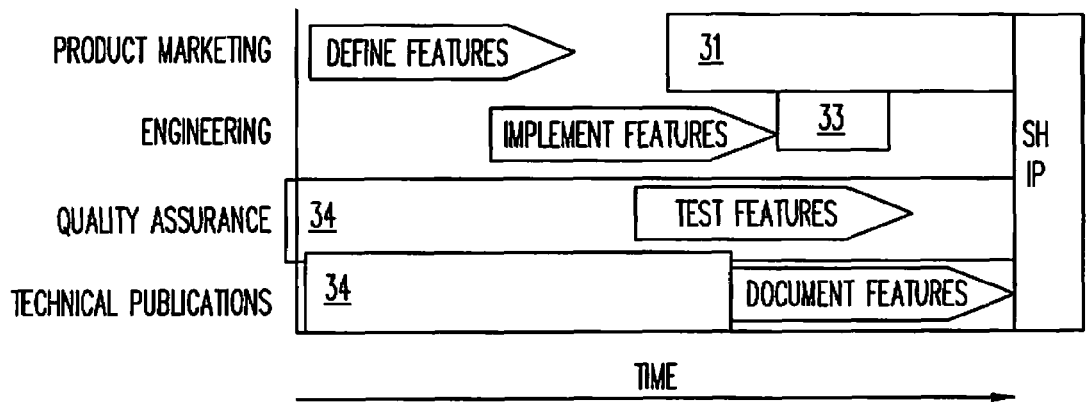
FIG. 1 is a time chart, illustrative of both the prior art and the present invention, generally, and showing the direction of order of the feature definition, feature implementation, feature test, and feature documentation steps in the software product release cycle.
Figure 2:
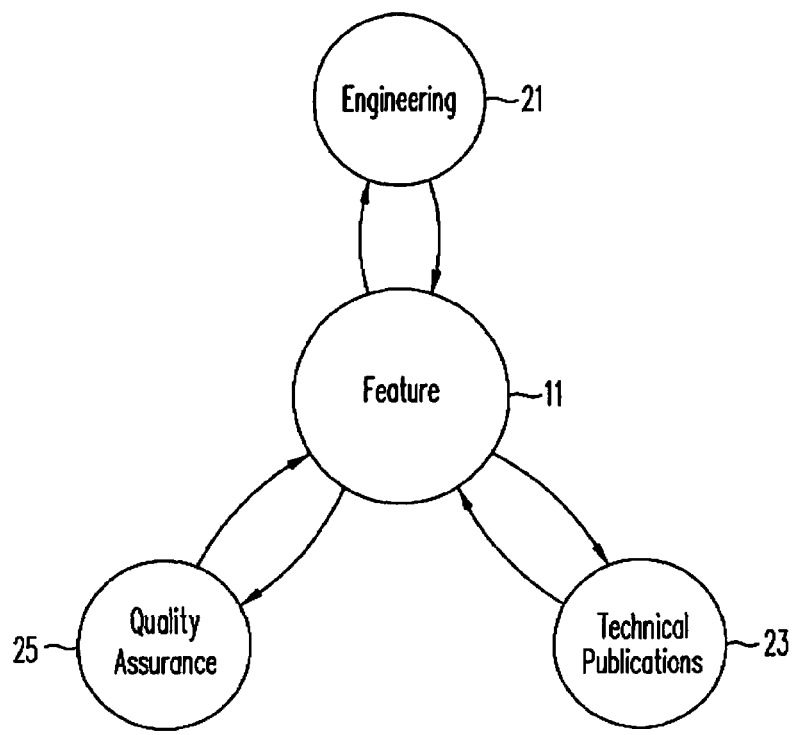
FIG. 2 is a hub-and-spoke illustration of the feature centric paradigm supported by the method and system of the invention.

The Release Manager method and system described herein is an integrated, automated system to help manage the four stages of the release process (shown in FIG. 1 illustrative of the prior art) and track the four stages of the release process and the overall release status through an overall, high level, visibility mechanism. This mechanism is illustrated in FIG. 2, which is a hub-and-spoke illustration of the feature centric paradigm supported by the method and system of the invention, and in FIG. 3, which is an expanded hub and spoke illustration of the feature centric paradigm supported by the method and system of the invention. FIG. 2 illustrates a hub and spoke paradigm with a feature, 11, as the hub, and task, for example, engineering tasks, 21, technical publications tasks, 23, and quality assurance tasks, 25, at the circumference, and joined to the feature, 11, by virtual spokes, 27, (representation information flows) and to each other by another set of virtual links.

Figure 3:
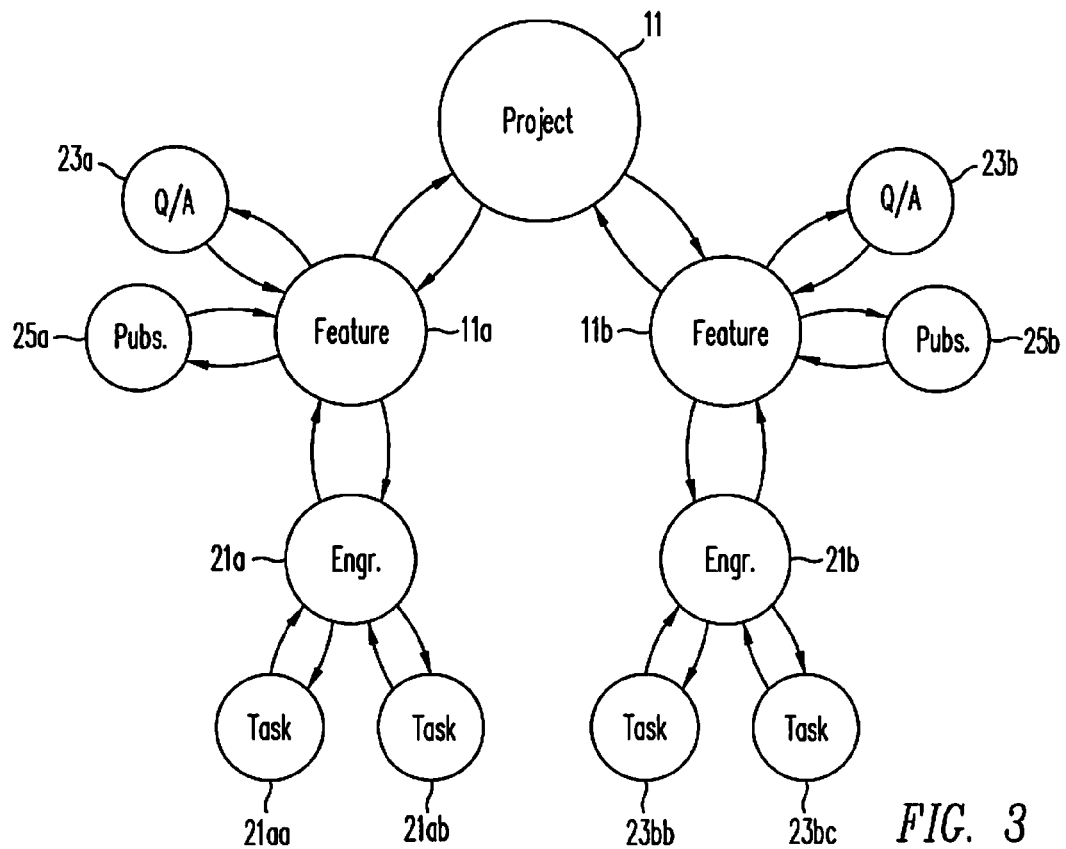
FIG. 3 is an expanded hub and spoke illustration of the feature centric paradigm supported by the method and system of the invention

FIG. 3 illustrates as a further application an expanded hub and spoke, feature centric model, deriving from a project, 1. Two features, 11a and 11b, are illustrated, with engineering tasks, 21a and 21 b, quality assurance task, 23a and 23b, and technical publications tasks, 25a and 25b. To be noted are the engineering subtasks, 21ab, 21aa, 23bc, and 23bb.

The general timeline and sequence of the product release process generally is shown in FIG. 1, where product marketing begins the release cycle by entering features into the system, determining which are to be implemented, and developing requirements documents. Engineering then defines the tasks required to implement the features and uses the system to track task completion. QA defines test plans to be run against the new features and uses the Release Manager method and system described below to track the test plan development. QA then executes the test plan in various operating environments and records in a database associated with the Release Manager the details of each test iteration. Finally, technical publications documents each feature and uses the Release Manager and its associated database or databases to track document development status.

Figure 4:
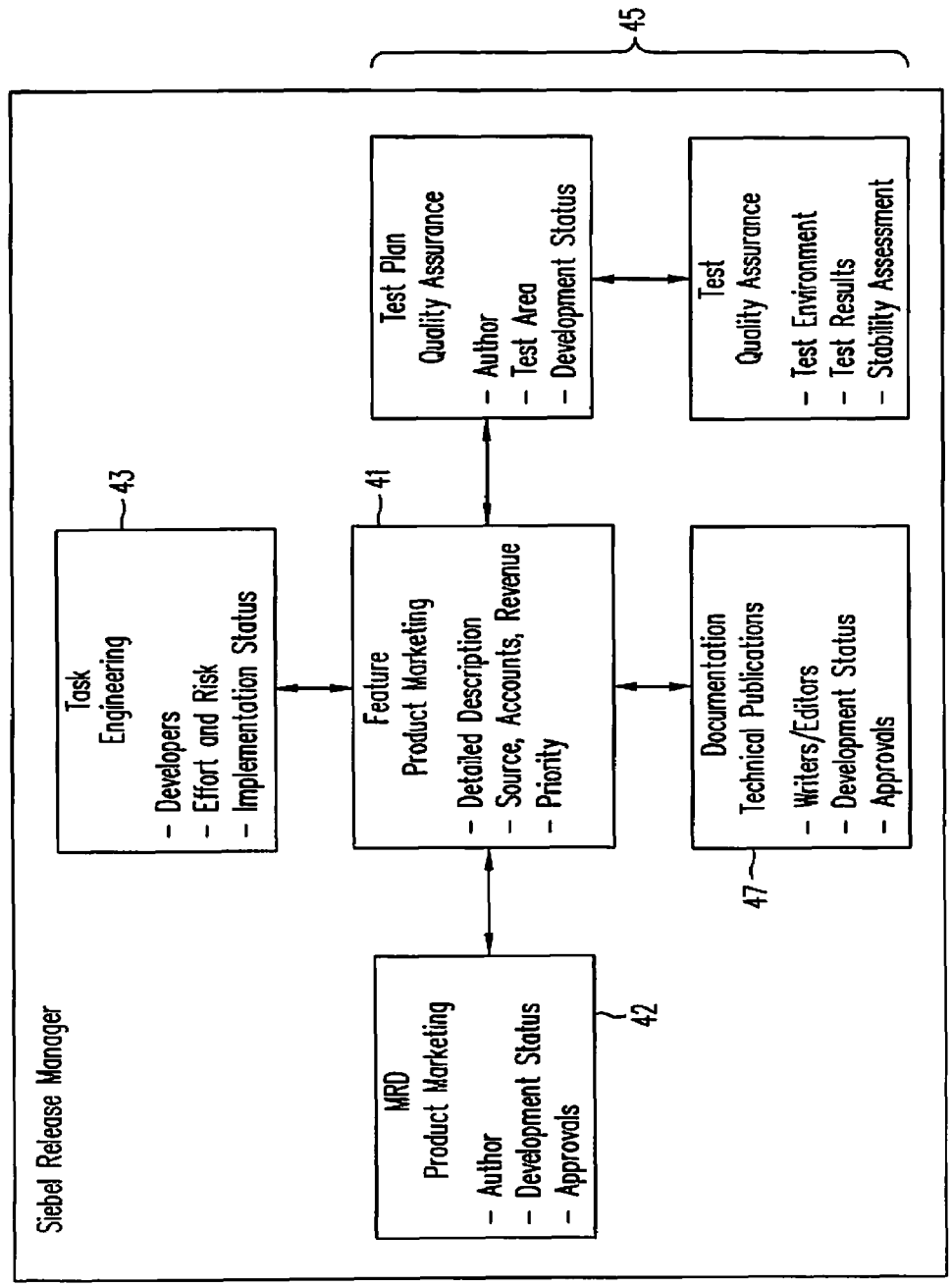
FIG. 4 illustrates the flow of information between product marketing at the hub, engineering, quality assurance, and technical publications, in the software product release cycle.

As shown in FIG. 4, all engineering tasks 43, QA tests, 45, and technical publications, 47, are linked back to their associated features. With this feature-centric system, critical decisions such as feature prioritization, resource allocation, and test planning are easily justifiable. Moreover, any Release Manager user can easily determine the development, testing, and documentation status for a given feature. When each of these areas is 100% complete for each feature, the product is ready to ship.

The feature centric, "hub and spoke" paradigm provides an overall visibility mechanism that empowers a user to communicate detailed feature descriptions throughout the organization, to prioritize features intelligently so that the right features get implemented, to develop marketing requirements documents for engineers to use as product specifications, to allocate engineering resources and track engineering tasks, to track QA test plan development and test execution, to track documentation development, to ensure release integrity, and to print status reports.

While the invention is described and illustrated with respect to the software product release process, it is, of course, to be understood that the method and system may be readily applied to the product release of any product.

DETAILED DESCRIPTION

The invention provides a method and system for monitoring and managing the product release process using an overall visibility mechanism that positively links features and tasks using, for example, the integrity constraints and keys of the relational database paradigm or, equivalently, the entity-relationship model of other database paradigms. Under the relational database paradigm, used solely for illustration and not limitation, a feature has a unique integrity constraint or master key. Every task or activity necessary to release the feature is positively linked to the feature through the feature's integrity constraint or key.

The invention may be understood by considering the user interfaces. In one embodiment the Release Manager has a set of views that users throughout the organization can use to track and manage the release of products, for example, software products. Although certain organizations will primarily be interested in those views relating directly to them (e.g., engineering will be most interested in the Engineer Task views), all views are available to all organizations to promote information sharing and teamwork. Much of the benefit of Release Manager lies in the linking of data managed by different organizations through a database structure that provides links. For example, product managers will be interested in the engineering tasks underway to implement their features, and QA managers will be interested in the new features that need to be incorporated in test plans. In the Release Manager, features are linked to QA test plans, engineering tasks, and tech pubs documents.

Figure 5:
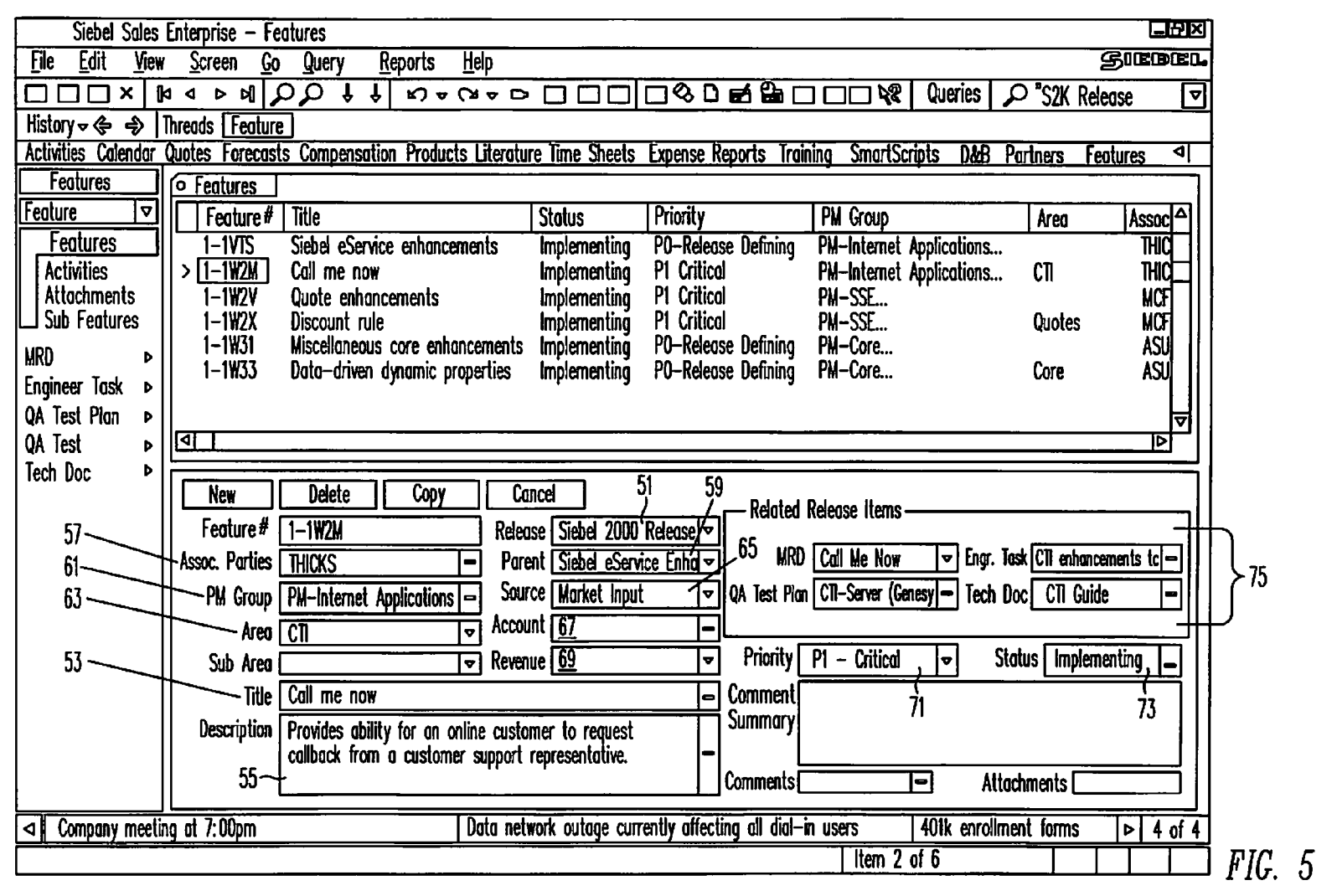

The first step in using the Release Manager is to enter features into the Feature List view of FIG. 5. This is done by filling in the following fields:

1. Release field 51: This field identifies the product.

2. Title field 53: This field displays a short title for the feature.

3. Description field 55: This field displays a description of the feature.

4. Assoc. Parties field 57: This field associates one or more members of the project team with this feature.

5. Parent field 59: If so desired, features may be organized into a hierarchy of parent features and subfeatures. To designate the current feature as a subfeature of a parent feature, select the parent feature from the picklist.

6. PM Group field 61: This feature associates one or more product marketing groups with this feature.

7. Area field 63: This feature associates a product or feature with a product area or a sub-area or both.

8. Source field 65: This field associates features with sources of the features. Possible sources of features include contractual requirements and market trends.

9. Account field 67: A feature may be the result of a request from or a contract with a specific customer. This field associates the feature with the customer.

10. Revenue field 69: If revenue is tied to delivering this feature, a revenue range may be selected from the list of values.

11. Priority field 71: The priority of the feature and/or the task is displayed in this field.

12. Status field 73: This field displays the overall status of this feature.

13. Related Release Items field 75: If desired, a user may link Marketing Requirements Documents, engineering tasks, QA test plans, and tech docs to this feature through these controls. It is assumed, for purposes of these instructions, that such linking will occur from other views.

In addition, comments may be added and files may be attached to this feature

Marketing Requirements Documents

Figure 6:
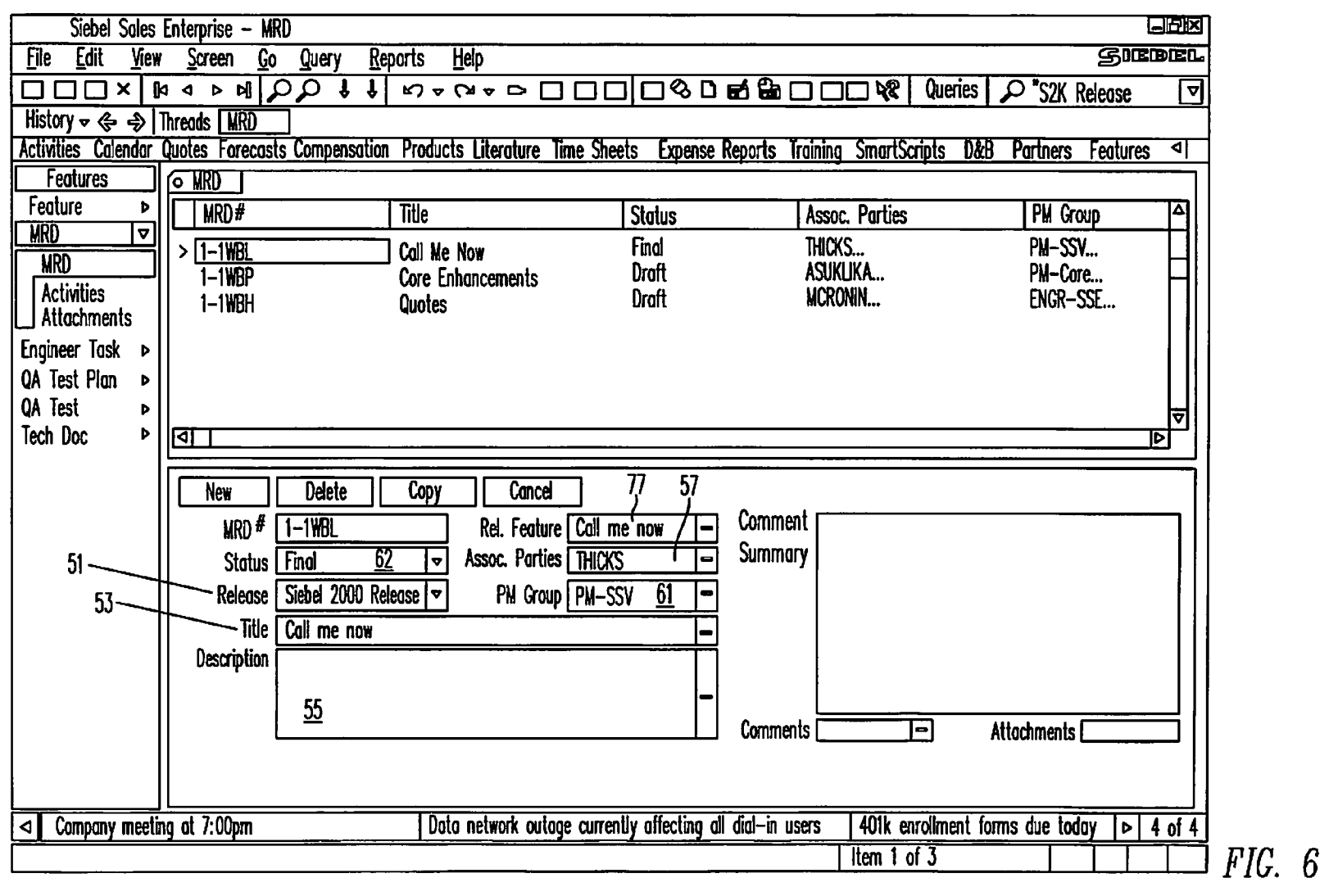

Product marketing managers enter and track information relating to Marketing Requirements Documents in the Marketing Requirements Document view of FIG. 6.

The Marketing Requirements Document of FIG. 6 contains the following fields.

1. Release field 51: This field identifies the product release.

2. Title field 53: This field contains a short title for the Marketing Requirements Document.

3. Description field 55: This field contains a description of the Marketing Requirements Document.

4. Assoc. Parties field 57: This field is used to associate one or more members of the project team with this Marketing Requirements Document.

5. PM Group field 61: This field associates one or more product marketing groups with this Marketing Requirements Document.

6. Status field 62: This field displays the overall status of this Marketing Requirements Document.

7. Rel. Feature field 77: This field is used to link the features documented in this Marketing Requirements Document to a particular record.

Engineering

Figure 7:
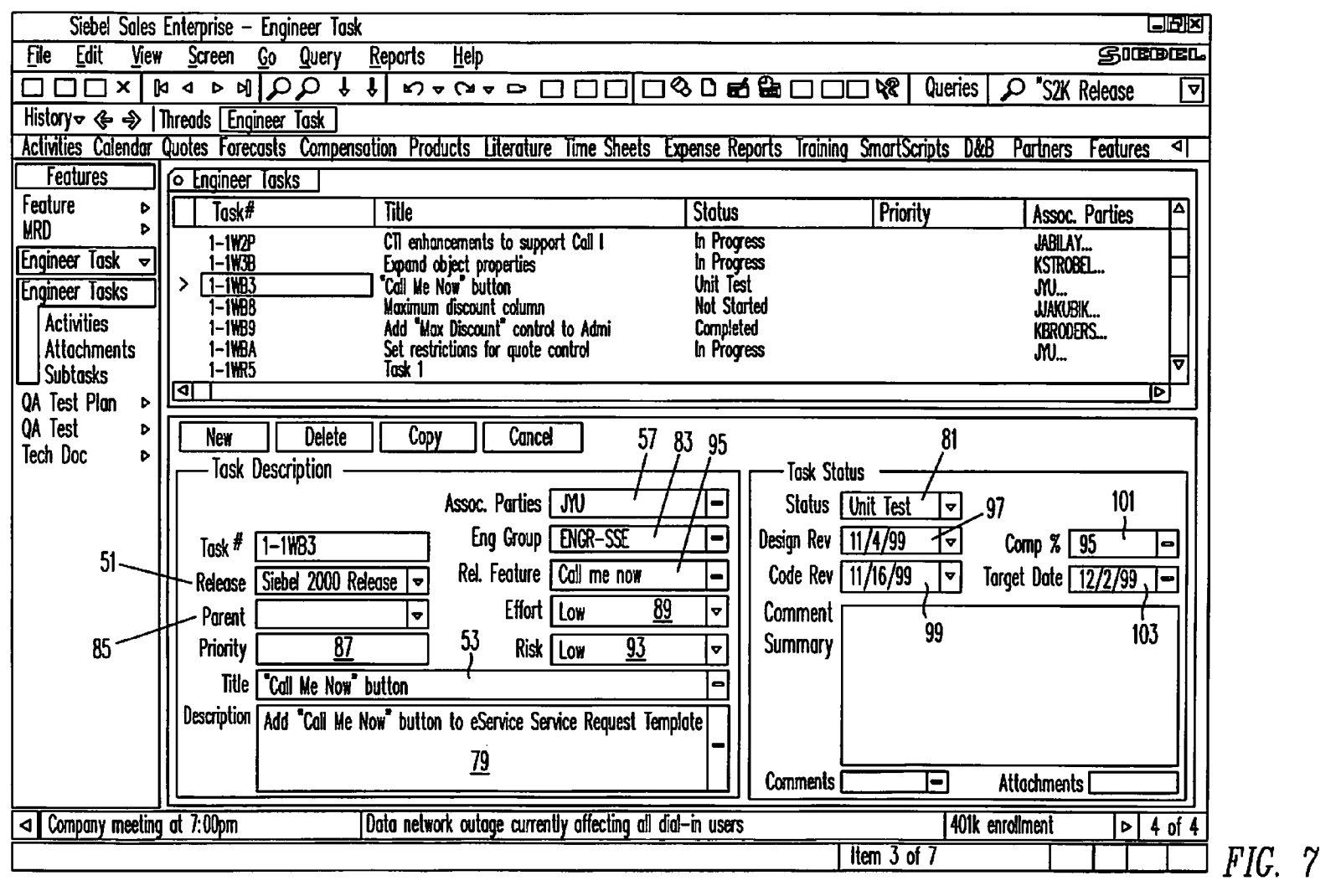

Engineering managers can use the Engineer Task List view shown in FIG. 7 to enter and track information relating to tasks being completed to implement features. Engineering tasks may include concept design, detailed design, design verification, prototyping, debugging, limited testing, and, in the case of hardware, prototyping, and trial or pilot production. Information about a task is entered into the "Task Description" area, 79, and information about the progress of the engineering effort is updated in the "Task Status" area, 81. Engineering managers are enabled to work with product marketing to ensure their engineering tasks are properly linked to features they are implementing. Engineering managers enter engineering tasks into the Engineering Task List view by filling in the following fields:

1. Release field 51: Identifies the engineering task to a product.

2. Title field 53: This field displays a short title for the engineering task.

3. Description field 79: This field displays a description of the engineering task.

4. Assoc. Parties field 57: This field associates one or more members of the project team with this task.

5. Eng Group field 83: This field associates one or more engineering groups with this task.

6. Parent field 85: If so desired, engineering tasks may be organized into a hierarchy of parent tasks and subtasks. This field is used to designate the current task as a subtask of a parent task.

7. Priority field 87: In this read-only field, the priority of the engineering task is calculated automatically as the highest priority of all linked features.

8. Effort field 89: This field displays the level of effort required to complete the task from the list of values.

9. Risk field 93: This field displays the level of risk associated with the task from the list of values.

10. Rel. Feature field 95: This field is used to link this task to the features being implemented by the task.

11. Status field 81: This field displays the overall status of this task from the list of values.

12. Design Review field 97: This field displays the date of the design review for this task.

13. Code Rev field 99: This field displays the date of the code review for this task.

14. Comp % field 101: This field displays the portion of the task that has been completed to date.

15. Target Date field 103: This field displays the target date that the task will be completed and code will be unit tested.

In addition, comments may be added and files may be attached to this task

Quality Assurance

QA managers use the Release Manager to manage and track both QA test plans and the tests that are executed against them.

Test Plans

Figure 8:
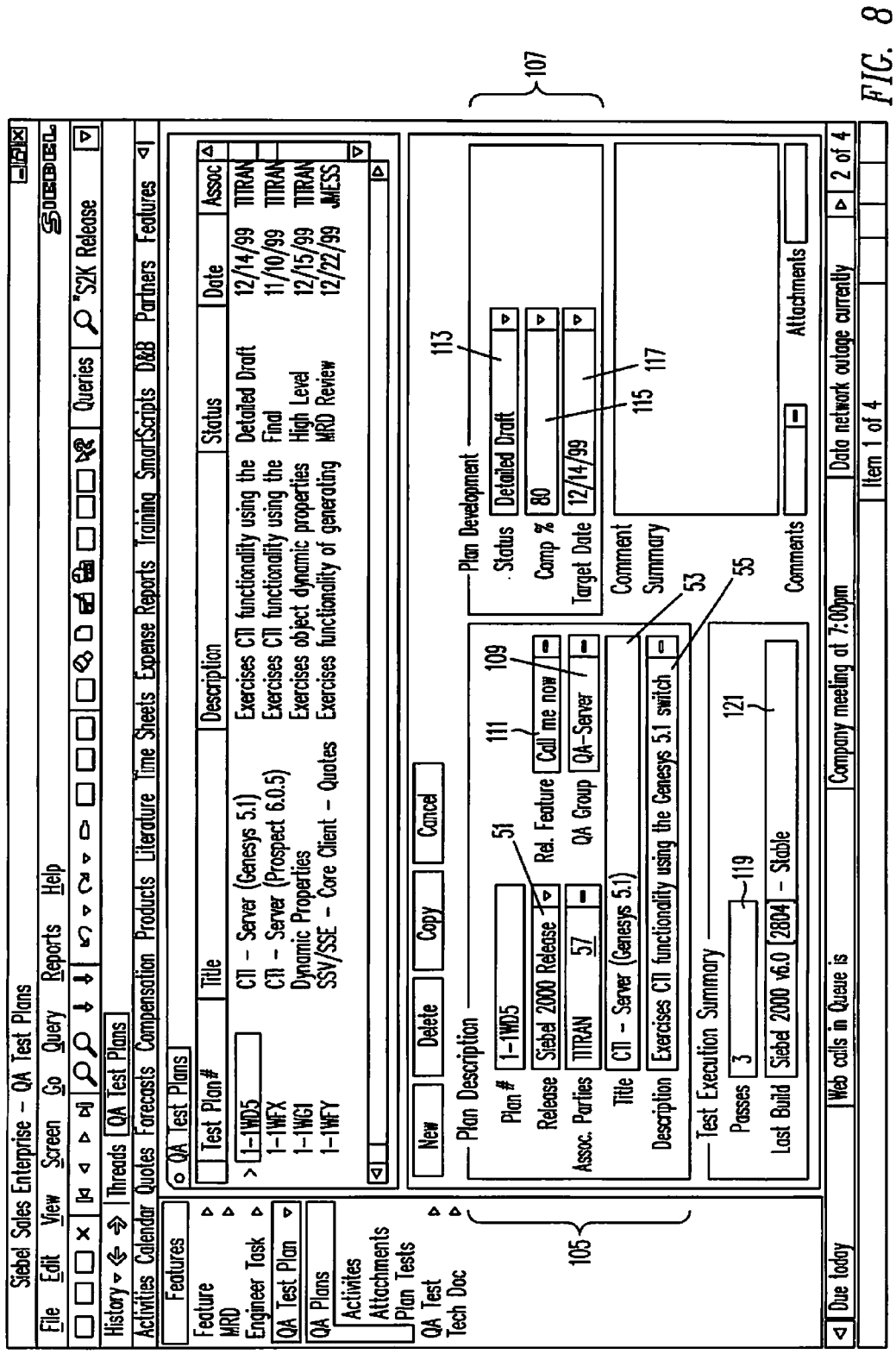
FIG. 8 illustrates a screen view of the "Quality Assurance" view of product release software.

QA managers use the QA Plans List view shown in FIG. 8 to enter and track information relating to QA test plans developed to test product features. Information about the test plan is entered into the "Plan Description" area, 105, and information about the progress of the effort to develop the test plan is updated in the "Plan Development" area, 107. QA efforts can include, for example, production assembly, inspection, reliability tests, maintainability tests, availability tests, physical tests, performance tests, functional tests, and product specific tests. QA managers may work with product marketing to ensure their test plans are properly linked to the new features they will be verifying. Test plans are entered and displayed into the QA Plans List view, FIG. 8, in the following fields:

1. Release field 51: Product identification is shown in this field.

2. Title field 53: This field displays a short title for the QA test plan.

3. Description field 55: This field displays a description of the QA test plan.

4. Assoc. Parties field 57: This field associates one or more members of the project team with this test plan 5. QA Group field 109: This field associates one or more QA groups with this test plan.

6. Rel. Feature field 111: This field links the test plan to the features it verifies.

7. Status field 113: This field displays the overall status of this test plan from the list of values.

8. Comp % field 115: This field displays the portion of the effort to develop the QA test plan that has been completed to date.

9. Target field 117: This field displays the target date that the QA test plan will be completed.

10. Passes field 119: This read-only field calculates the number of tests that have been executed against the test plan.

11. Last Build field 121: This read-only field displays the last build number tested with this test plan and the stability status as assessed by the tester during that test.

Tests

Figure 9:
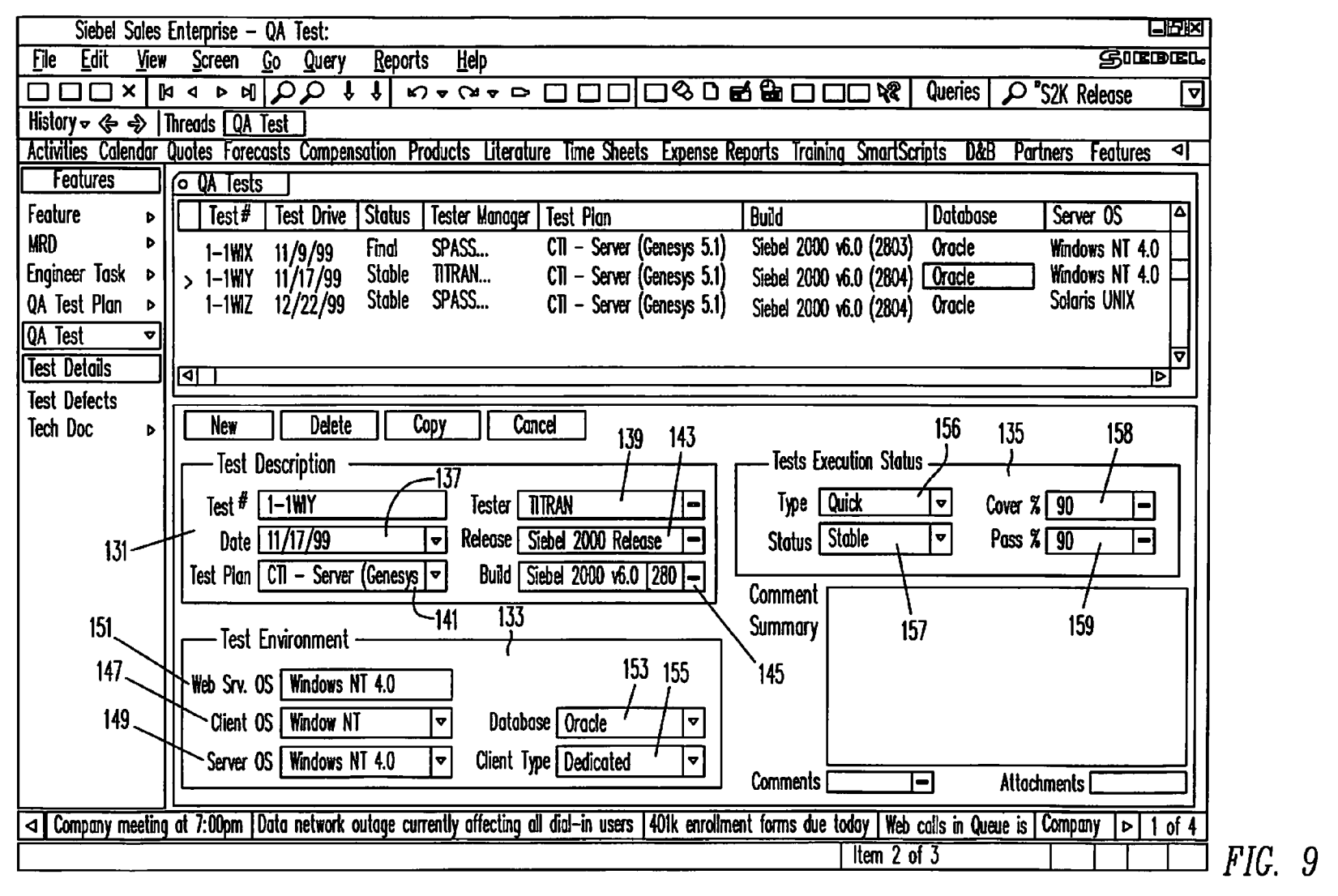

QA managers can use the QA Test Details view of FIG. 9 to enter and track information relating to tests conducted during the course of the release. Information about a test is entered into the "Test Description" area, 131, information about the test environment is entered into the "Test Environment" area, 133, and information about the test results is entered in the "Test Execution Status" area, 135. The following fields may be accessed.

1. Date field 137: The date the test was executed.

2. Tester field 139: Displays the person who conducted the test.

3. Test Plan field 141: Displays the test plan that was executed.

4. Release field 143: This read-only field is determined by the release associated with the test plan selected in step 3.

5. Build field 145: This field displays the build number that was tested.

6. Client OS field 147: This field displays the operating system of the client test machine.

7. Server OS field 149: This field displays the operating system of the server in the test environment.

8. Web Srv. field 151: This read-only field displays the operating system of the web server in the test environment.

9. Database field 153: This field displays the database used for the test from the list of values.

10. Client Type field 155: This field displays the client deployment option (dedicated, Java Thin Client, Thin Client for Windows, or HTML Thin Client) from the list of values.

11. Type field 156: This field displays the test type from the list of values.

12. Status field 157: This field displays the stability status of the tested area from the list of values.

13. Cover % field 158: This field displays the portion of the test plan covered.

14. Pass % field 159: This field displays the portion of the test plan that passed.

Technical Publications

Figure 10:
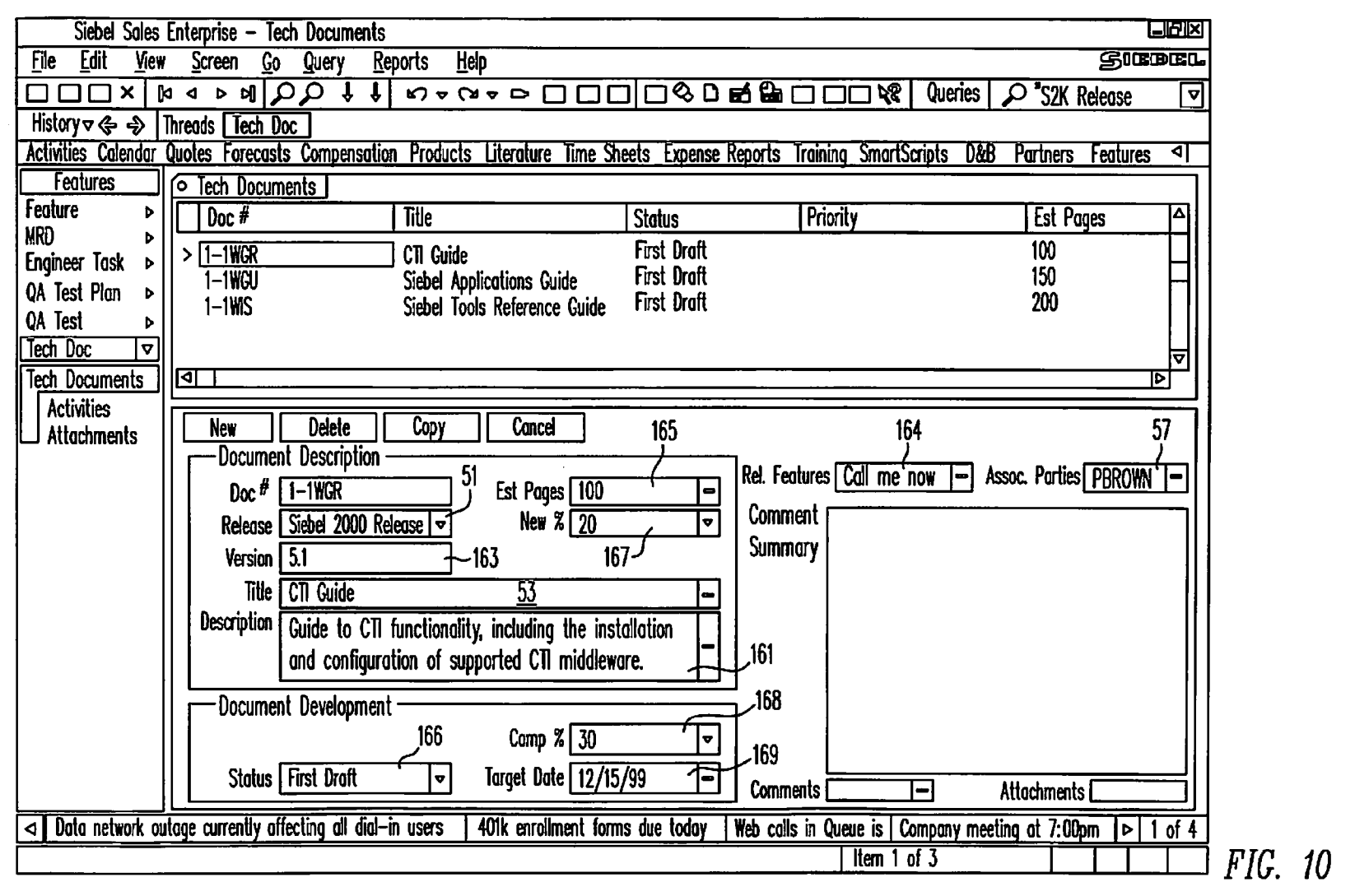

Managers in technical publications use the Tech Documents List view shown in FIG. 10 to enter and track information relating to documents being developed to describe product features.

Tech pubs managers generally work with product marketing to ensure their documents are properly linked to the features they describe. Documentation records are entered into the Tech Documents List view, FIG. 10, by filling in the following fields:

1. Release field 51: The product which the feature is a part of.

2. Title field 53: This field displays a short title for the document.

3. Description field 161: This field displays a description of the document.

4. Version field 163: This field displays the version number of the document.

5. Est Pages field 165: This field displays the estimated number of pages of the completed document.

6. New % field 167: This field displays the portion of the document content that will be new once he document is completed.

7. Assoc. Parties field 57: This field associates one or more members of the project team with this particular document 8. Rel. Feature field 164: This links this document to the features it describes.

9. Status field 166: This field displays the overall status of this document from the list of values.

10. Comp % field 168: This field displays the portion of the overall effort to develop the document that has been completed.

11. Target field 169: This field displays the target date that the document will be completed.

Additionally, enterprise specific approvals and clearances may be built into the system and method of product release manager. For example, senior management and executive approvals, and "sign-off's" by advertising, marketing, sales, distribution, channel partners, business practices, legal, insurance, product safety, and environmental approvals may be incorporated into the system and method described herein.

Figure 12:
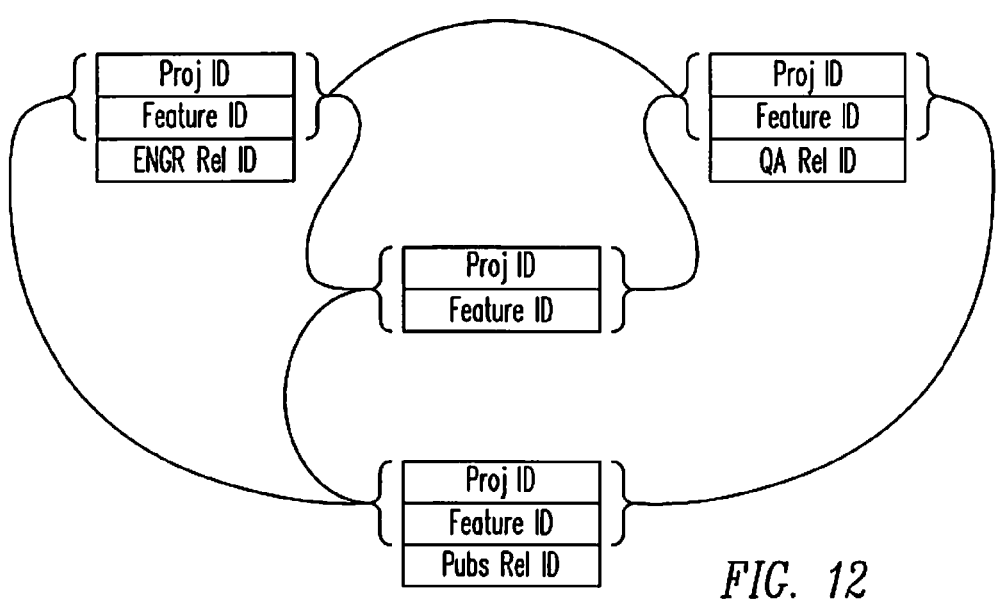
FIG. 12 illustrates the relational database schema of FIG. 11 interconnected as shown by the relationships of FIGS. 1 and 2, and linked through the PROJECT ID, and the concatenation of the PROJECT ID and the FEATURE ID, with a unique identifier of the concatenation of the PROJECT ID, the FEATURE ID, and the task specific RELEASE ID.

Relational Database Management System for Implementing The Release Manager Method and System FIGS. 11 and 12 illustrate database schema for a simple relational database management system for use with method and system of the release manager. The matrices 1101, 1102, 1103, 1104, 1105, 1106, and 1107 represents a particular entry type, as PROJECT, FEATURE, ENGINEERING, QUALITY ASSURANCE, QUALITY ASSURANCE (INDIVIDUAL TEST), TECHNICAL PUBLICATIONS and ENTERPRISE SPECIFIC. The first bolded cell represents the master key, as well as the entry for the project id, which is assumed to be unique. The second bolded cell contains the feature id, which when concatenated with the project id is assumed to be a unique candidate key for the feature. Note that "keys" are equivalently referred to as integrity constraints.

New tasks and tests are created by initiating an appropriate INSERT operation and by initiating the appropriate MODIFY operations, as is well known in the relational database art. Screens and views are provided by the appropriate SELECT and FILTER operations, typically in association with view or form applets.

The functional stages and steps, engineering, quality assurance, and technical publications, as well as enterprise specific activities are illustrated, where the concatenation of the project id, the feature id, and a function specific id provides a candidate key, integrity constraint, or foreign key. As shown in FIG. 12, this candidate key can be used to retrieve all of the activities relating to a feature, for example, by searching on the concatenation of PROJECT ID and FEATURE ID, optionally with functional area entries (as for engineering, quality assurance, technical publications, and other ancillary functions) properly set so as to retrieve, for example, quality assurance activities with respect to a particular feature.

The above description is strictly illustrative, and other database management systems, schema, and strategies may be used without departing from the spirit of the invention.

Managing the Release

The Release Manager is more than a helpful tool for product marketing, engineering, quality assurance, technical publications and corporate staff functions to track release-related activities. It is also useful in managing the release and ensuring that important details don't fall through the cracks. Following are examples of how the Release Manager might be used to ensure an on-time release, a high quality, and customer satisfaction:

Product marketing can ensure that important features are not forgotten by querying the Release Manager regularly for features associated with contractual requirements, high revenue customers, or high-profile customers.

Since candidate features are maintained in the Release Manager from the moment they are first considered, engineering can get an early start on scoping development effort and need not wait for a formal release plan.

Product marketing can ensure that all features are properly specified in Marketing Requirements Documents. Features without matching Marketing Requirements Documents are immediately apparent.

The most current version of engineering, marketing, and technical documents is always available in Siebel Release Manager.

Engineering can allocate development resources efficiently based on the relative priority of the features to which engineering tasks are linked.

QA managers reduce quality risk by focussing testing efforts on those test plans that are associated with the greatest number of new features.

Tech pubs and QA can guarantee release integrity by ensuring that all features are properly documented and tested. Features not linked to any documents or test plans will be immediately apparent in the Feature List View of the Release Manager.

Release meetings will be run more efficiently. Since status is available to the entire organization through the Release Manager, valuable time need not be devoted to covering this information in detail at release meetings.

Activities may be linked to features, engineering tasks, QA test plans, and tech docs. For example, a multi-value link allows easy setup of project teams, tech pubs documents, and test plans for new releases based on a previous release. Similarly, linking of defects to test plans may be supported, as in associating a test plan with a defect.

The Priority control in the Engineer Task List view may be configured to display the highest priority of any features linked to it.

An explorer view provides convenient display of all engineering task, test plans, and tech pubs documents associated with a given feature.

While the invention has been illustrated and described with respect to certain preferred embodiments and exemplifications, it is not intended to limit the scope of the invention thereby, but solely by the claims appended hereto.

I claim:

1. A method comprising:
    managing a release of a product, comprising
        describing the product in terms of a plurality of product features of the product;
        entering a description of each of said product features, wherein said description comprises an instantiation of a feature list graphical user interface;
        defining a plurality of tasks, wherein each of said tasks is associated with one of said product features, the plurality of tasks being grouped into task types;
        linking each of the plurality of tasks with one of the plurality of product features;
        entering a task progress development as an instantiation of a task-type graphical user interface, wherein the task-type graphical user interface is selected from a plurality of task-type graphical user interfaces, each corresponding to one of the task types; and
        tracking a status of each product feature via the instantiated task-type graphical user interfaces.

2. The method of claim 1, further comprising:
    linking all of the graphical user interfaces to one another via the product features.

3. The method of claim 2, further comprising:
    storing the feature descriptions, task definitions and task progress developments in a relational database; and
    wherein linking comprises:
        linking each task definition and related task progress developments to their corresponding one of the product features through the use of relational database keys.

4. A system comprising:
    a product release system configured to manage a release of a product, comprising
        a product feature list user interface by which a user enters product features of the product to be released;
        an engineer task list user interface by which the user enters and tracks information related to tasks being completed to implement the product features entered in the product feature list user interface, wherein the tasks correspond to one of the product features;
        a quality assurance user interface by which the user manages and tracks both quality assurance test plans and tests that are executed against the test plans and designed to ensure the functionality of the product features; and
        a technical documents list user interface by which the user enters and tracks information related to documents being developed to describe the product features,
        wherein all parameters entered by the user into the engineer task list user interface, the quality assurance user interface and the technical documents list user interface are each defined in terms of a particular one of the product features entered into the feature list user interface.

5. The system of claim 4, wherein all parameters entered by the user into the engineer task list user interface, the quality assurance user interface and the technical documents list user interface are each linked to a particular one of the product features entered into the feature list user interface.

6. The system of claim 4, further comprising:
    a relational database operable to store data entered into the interfaces, and further operable to filter the data based on the product features.

7. A method comprising:
    managing a release of a product, comprising
        describing the product in terms of product features of the product;
        defining, for each product feature, a plurality of tasks necessary to implement the each product feature;
        linking each task with its corresponding product feature; and
        entering data associated with a selected one of the plurality of tasks into a graphical user interface associated with the selected task.

8. The method of claim 7, further comprising:
    selecting a graphical user interface displaying data associated with a task based on the product feature associated with the task.

9. The method of claim 7, further comprising:
    storing the features, tasks and data in a relational database; and
    linking the tasks and their associated data with their associated product features by assigning a key to each product feature, task and datum.

* * * * *